Sept. 6, 1960 J. W. DE BRUYN 2,951,913

MAGNETIC DEVICE FOR SOUND REPRODUCING MEANS

Filed July 21, 1955

INVENTOR

JOHANNES WILHELMUS DE BRUYN

BY

AGENT

United States Patent Office 2,951,913 Patented Sept. 6, 1960

2,951,913

MAGNETIC DEVICE FOR SOUND REPRODUCING MEANS

Johannes Wilhelmus De Bruyn, Eindhoven, Netherlands, assignor, by mesne assignments, to North American Philips Company, Inc., New York, N.Y., a corporation of Delaware Filed July 21, 1955, Ser. No. 523,404

Claims priority, application Netherlands July 22, 1954

6 Claims. (Cl. 179—100.2)

Figure 1:
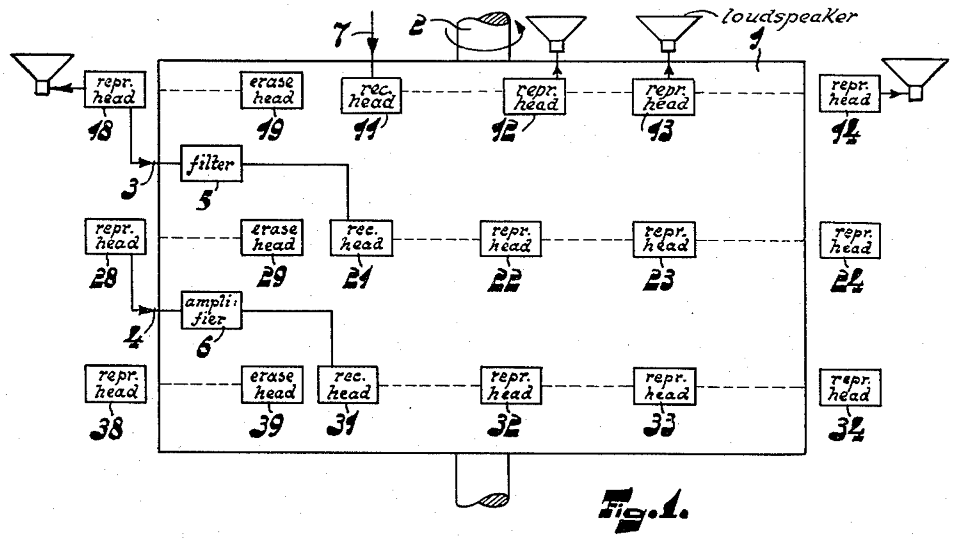

This invention relates to a device for reproducing sound in closed spaces.

In such devices, the signal to be reproduced is magnetically recorded onto a continuous or endless carrier and reproduced by means of a plurality of magnetic reproducing heads, the latter being connected to various scattered loudspeakers for producing sounds from the same signal delayed relative to one another, and, if desired, with different intensity and/or timbre. Such a device may be used for simulating reverberation in a closed space. The sound reproduction of each loudspeaker imitates a reflection of the primary signal from a wall. Since a sound wave is, in general, many times reflected from the walls enclosing the space, the required number of reproducing heads will have to be increased as the requirements imposed with regard to fidelity of the reverberation become more stringent.

It is known to increase the number of reflections by means of feedback between any of the reproduction heads and the recording head. This construction has the advantage of reducing the number of required magnetic heads, but suffers from the disadvantage that a signal impressed by the recording head upon the carrier or magnetic track is constantly transmitted in the same intensity ratio by the reproduction heads to the respective loudspeakers. This intensity ratio is predetermined, for example, by deriving the electric voltages from the reproduction heads by means of a voltage divider, such as a potentiometer, and by setting this ratio as desired for the successive reproduction heads. This setting remains constant during reproduction, during feedback, and the same but weakened signal will successively interact with the same reproduction heads. Hence this known device will not be satisfactory in its ability to imitate previously chosen reverberation curves, which require independent control of the intensity of each reflection.

Again, in the conventional devices, the reproduction heads are arranged to extend in the direction of travel of the carrier after the recording head. The magnetic carrier used may consist of flexible tape, for example, a polyvinylchloride layer supporting or incorporating magnetic powder, driven and passed over rollers. When the number of reproduction heads is increased the use of such a tape-shaped carrier involves the disadvantage that the tape tends to run irregularly. This occurs because of the resistance, which increases with the number of heads, experienced when the carrier traverses these heads. This resistance produces uneven tape speed due to elasticity of the carrier material.

On the other hand, if a drum is employed to support a blade-shaped carrier or even to carry the magnetic material, the drum diameter will have to be increased in accordance with the increased number of reproduction heads. Since requirements are imposed on the device with respect to the spacing between the drum with magnetic material on the one hand, and the magnetic heads provided around the periphery in spaced relation to the drum on the other hand, and to obtain precise rotation of the rotary drum, the drum diameter will, for constructional reasons with regard to tolerances, have to be minimized, which, in turn, will reduce the number of magnetic heads that can be used.

All these difficulties are obviated in accordance with the invention by providing a device wherein a plurality of recording heads are employed arranged in such manner that each recording head, together with an erase head and one or more reproduction heads, constitute a separate unit. Further, at least two such units are arranged in the direction of width of the support for the magnetic carrier, and each recording head, with the possibly desired exception of the recording head to which the signal to be reproduced is initially supplied, is coupled to a reproduction head of another unit. In this respect, the term "separate unit" is to be understood to mean an independent set of heads capable of recording, reproducing and erasing a given magnetic signal. In general, this denotes that each separate unit of magnetic heads will be associated with a given magnetic track.

In one embodiment of the invention, the magnetic carrier is supported at the outer periphery of a rotary drum. In this case, not only will the influence of elasticity of the carrier material be eliminated, but wear of the carrier will be considerably reduced on traversing the magnet heads, since in the case of a constant number of heads, the wear is divided over a larger carrier surface. In a different embodiment of the invention, the carrier is constituted by the outer periphery of a rotary drum. The arrangement of the magnetic heads in accordance with the invention enables the drum diameter to be reduced.

In order to improve the signal-to-noise ratio, at least in one case an amplifier may be connected between a recording head and the reproducing head from which it derives its signal. To secure frequency-dependent reverberation, in a particular embodiment of the invention, at least in one case an electric filter may be connected between a recording and reproducing head. Further, for constructional reasons, in accordance with the invention, all the tracks on the magneitc carrier may be erased by means of a common erase head.

The invention will now be described with reference to the accompanying drawing, in which, Fig. 1 shows, diagrammatically, a device for reproducing sound in accordance with the invention.

Figure 2:
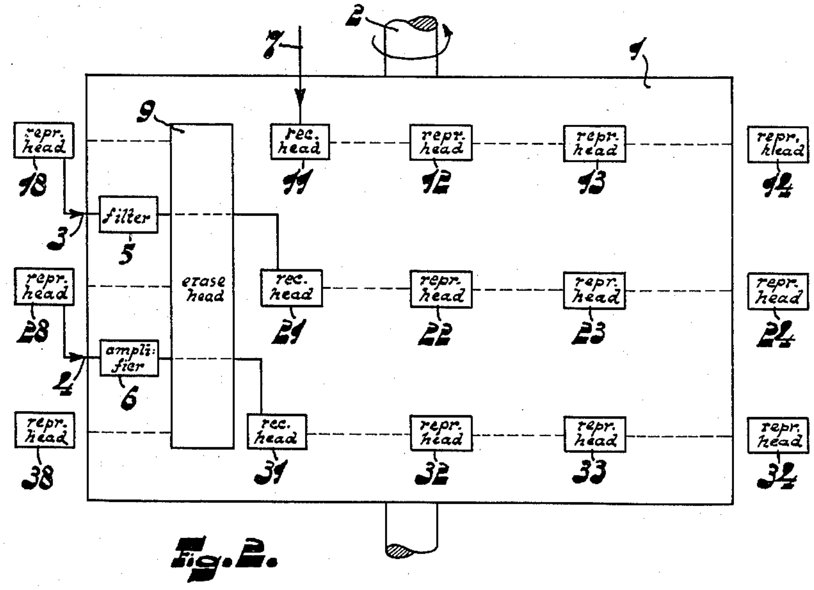

Fig. 2 shows the same device in which the different erase heads have been replaced by one common erase head.

Referring now to the drawing, the signal to be reproduced is recorded on an endless carrier in the form of a cylindrical drum 1 along the outer surface in which magnetic material is provided and which rotates about a shaft 2 in the direction indicated by the arrow. The device furthermore comprises a plurality of recording heads and a plurality of reproduction heads connected to various scattered loudspeakers by which the same signal may be reproduced with a time delay, and, if desired with different intensity and/or timbre. In accordance with the invention, the positioning of the magnetic heads relative to the drum 1 is such that ecah recording head together with an erase head and one or more reproduction heads associated with the same magnetic track constitute a separate unit. In the example shown in the drawing, three of such units are arranged around the drum 1. The first unit comprises a recording head 11; reproduction heads 12, 13, 14, and 18; and an erase head 19. Similarly, the second unit comprises a recording head 21; reproduction heads 22, 23, 24 and 28; and an erase head 29. The third unit comprises a recording head 31; reproduction heads 32, 33, 34 and 38; and an erase head 39. In accordance with the invention, these three units are arranged in the direction of width of the drum 1 and vertically below each other. The units need not be of identical construction and may, moreover, with regard to the recording head, begin at any desired point of the periphery of the drum; that is to say, the three recording heads 11, 21 and 31 need not be aligned.

The operation of the device is as follows: The signal to be reproduced is supplied to the recording head 11 via the conductor 7 and is magnetically recorded onto a portion of the drum 1. Since the drum 1 rotates in the direction shown in the drawing this first magnetic track travels along successively arranged reproduction heads 12, 13, 14 to 18 of the first unit. These heads will transfer the signal with a given intensity, which is previously determined for each head, to associated scattered loud-speakers (not shown). The last reproduction head 18 is electrically connected through a lead 3 to the recording head 21 of the second unit, which thus provides that the same signal, which is erased from the first track by the erase head 19 of the first unit, now subsists at a different point of the carrier, namely, the second track. This magnetic signal recorded for the second time is subsequently reproduced by the loudspeakers associated with the reproduction heads 22, 23, 24 to 28 of the second unit, and then erased by the erase head 29, after having been recorded for the third time at a different point, the third track, via a lead 4 and the recording head 31 of the third track. This same signal is again reproduced by the loudspeakers connected to the reproduction heads 32, 33, 34 to 38 of the third unit. In this arrangement, therefore, the sound intensity of each of the signals reproduced by the separate loudspeakers can be individually varied as desired.

A further advantage of this arrangement is that the electrical signals over the lines 3 and 4 can be separately controlled. For example, it may be necessary to filter a given frequency range, if the reverberation time is to be made frequency dependent. To this end, in accordance with the invention, a filter 5 with any desired characteristic, may be connected between the reproducing head 18 and the recording head 21.

In general, the intensity of reproduction by the heads successively decreases continuously and so the signal-to-noise ratio decreases too. In view of improving this, an amplifier 6 may be coupled between the reproducing head 28 and recording head 31. Now the amplified signal can be attenuated as desired.

It will be appreciated that the various controls thus provided increases the possibilities of successfully imitating a given reverberation curve in a hall or room, since the presence of several separate units permits the intensities of reproduction of the reproducing heads to be selected and established independently of each other.

The number of imitation possibilities can be further increased by again coupling a plurality of reproduction heads back to one or more recording heads. By such a step, a signal can be recorded for a long time on the magnetic carrier and at all times be reproduced with different intensity and/or timbre. By coupling, for example, the reproduction head 12 to the recording heads 21 and 31, the reproduction head 22 to the recording heads 11 and 31, and the reproduction head 32 to the recording heads 11 and 21, such a cumulative effect is obtained that the number of reflections increases more than linearly with time, which, in effect, also occurs in the case of reverberation in a closed space.

Fig. 2 shows the same device, just mentioned and described. The operation occurs in the same way. The only difference between the two figures is that the three erase heads 19, 29 and 39 of Fig. 1 have been replaced by one common erase head 9 in Fig. 2. Besides an operative advantage, the use of this common erase head means an obvious saving of material.

While I have described my invention in connection with specific embodiments and applications, other modifications thereof will be readily apparent to those skilled in this art without departing from the spirit and scope of the invention as defined in the appended claims.

What is claimed is:

1. A sound-reproducing system comprising continuous carrier means on which signals may be magnetically stored along a plurality of tracks, a plurality of magnetic units each associated with a different magnetic track of said carrier means, each of said units comprising magnetic recording and reproducing means for recording and reproducing signals on and from said carrier respectively, the recording means of one of said units being coupled to the reproducing means of another of said units, and a plurality of sound-producing devices each coupled to a reproducing means of the units.

2. An artificial reverberation system comprising continuous carrier means on which signals may be magnetically stored along a plurality of separate tracks, a plurality of separate, laterally-disposed, magnetic units each associated with a different magnetic track, each of said units including separate erase, recording and a plurality of reproducing means for the signals, means coupled to the recording means of one of said units for introducing a signal onto one track of said carrier, means coupling together a reproducing means of said one unit with the recording means of another unit whereby the said signal may be recorded, after a given delay, on another magnetic track, and a plurality of separate sound-producing devices each coupled to one of the reproducing means.

3. A system as set forth in claim 2 wherein the coupling together means includes signal amplifying means.

4. A system as set forth in claim 2 wherein the coupling together means includes electrical filter means.

5. In a device of the character described, the combination comprising a plurality of separate units, each of said units comprising a magnetic recording head, a plurality of magnetic reproducing heads and an erasing head, a rotary drum associated with said units, magnetic storage carrier means mounted on the outer surface of the drum, said units being spaced along the axis of the drum and being thus adapted to cooperate with different portions of the carrier means, the magnetic heads of each unit being mounted in a circle about the periphery of the drum, means coupling together at least one reproducing head of one unit to a recording head of another unit and a plurality of loud-speakers each coupled to one of the reproducing means.

6. A device as set forth in claim 5 wherein means are provided for supplying an input signal to the initial recording head.

References Cited in the file of this patent

UNITED STATES PATENTS

| | | |
|---|---|---|
| 2,105,318 | Goldsmith | Jan. 11, 1938 |
| 2,424,633 | Rieber | July 29, 1947 |
| 2,674,660 | Ambrose | Apr. 6, 1954 |
| 2,679,551 | Newby | May 25, 1954 |